Nov. 1, 1966   F. POEPEL ET AL   3,282,803
OXYGEN ABSORPTION

Filed Feb. 20, 1962   2 Sheets-Sheet 2

United States Patent Office 3,282,803
Patented Nov. 1, 1966

3,282,803
MEASURING OXYGEN ABSORPTION
Franz Poepel and Helmut Steinecke, Stuttgart, Germany, assignors, by mesne assignments, to J. M. Voith G.m.b.H., Heidenheim (Brenz), Germany
Filed Feb. 20, 1962, Ser. No. 174,443
Claims priority, application Germany, Feb. 22, 1961, H 41,805
7 Claims. (Cl. 204—1)

The present invention concerns a method and arrangement for measuring oxygen absorption, more especially for measuring biochemical oxygen absorption, for example, when ascertaining the BOR (biological oxygen requirement) in the distribution of a water supply, in which method and arrangement a pressure drop is created by oxygen absorption, the arrangement components being closed towards the outer atmosphere and maintained at a constant temperature, and comprising an oxygen storage container and a pressure gauge are associated with a test vessel.

In conventional methods used hitherto for determining the biochemical oxygen consumption, the oxygen is produced constantly by electrolytic methods commensurate with the instantaneous consumption and the current intensity recorded in conjunction with the time taken. The biochemical oxygen consumption may be ascertained graphically by means of integrating the area between the recorded curve and abscissa. The expenditure in electrical circuit members is considerable and the evaluation for ascertaining intermediate values particularly cumbersome. The apparatus can therefore only be operated by trained personnel.

It is an object of the present invention to remove these disadvantages and deficiencies and to provide a method and arrangement the use of which makes it possible, by means of simple, conventional circuit members, to indicate and/or record the measuring results in such a manner that recalculation or conversion is eliminated. The new arrangement is suitable to be assembled, and for its individual component members to form a unit, by addition of further units to which it may form a compact aggregate.

According to the present invention therefore, a method for measuring oxygen absorption is provided, more especially the biochemical oxygen absorption of water, for example when ascertaining the BOR (biological oxygen requirement) in a water supply, by determining the drop in pressure created by the oxygen absorption in a measuring system closed to the outer atmosphere and maintained at a constant temperature, in which method a test vessel is associated with an oxygen storage container and a pressure gauge, and in which the absorbed oxygen quantities are supplied intermittently from the storage container to the test vessel, and are directly indicated on an instrument in known units, for example, milligrammes per litre, without the aid of conversion of the data obtained thereby.

Also according to the present invention, an arrangement for measuring oxygen absorption comprises a test vessel, a pressure gauge for indicating when the arrangement is at pressure equilibrium, and a calibrated burette, each being interconnected by means of flexible tubes, the pressure gauge being connected to an oxygen supply adapted to be opened or closed, and comprising a transparent tube closed at the bottom and adapted to receive a quantity of mercury covered with a layer of light medium, such as paraffin oil, and an inner indicating pipe, which in the region of the mercury level has a bulge and, approximately half way up, has a ring mark.

Also according to the present invention, an arrangement for measuring oxygen absorption comprises a test vessel, a contact pressure gauge, and an electrolysis cell, the contact pressure gauge having an electrode located above the meniscus of a volume of mercury placed therein, in such a manner that the electrode is not in contact with the mercury when the arrangement is at pressure equilibrium and is in contact with the mercury when a drop in pressure in the arrangement occurs.

The invention provides for the intermittent replacement of the absorbed oxygen into the test vessel to be brought about by subsequently forcing, by manual actuation, a sealing liquid into a burette and the indication of the end values on a calibrated scale of this burette.

In an embodiment of the method in accordance with the present invention an automatic replacement of the oxygen absorbed may be carried out by permitting a pressure drop to act on a contact pressure gauge which releases the oxygen supply. In this case, the extraction of the oxygen to be supplied from the storage container is effected in constant volumetric units, and the number of volumetric units supplied to the test vessel which are proportional to the end value in milligrammes per litre are digitally indicated by pulse counter and are preferably recorded in print.

The oxygen to be replaced is kept in readiness in the storage container in a chemically-bound form, for example, as an aqueous solution of copper sulphate and is released by means of an electrolysis current of constant current intensity and adapted to be switched on by the contact pressure gauge.

In a further embodiment of the method, the switching time of the decomposition cell (electrolysis cell) is transmitted, via a synchronous motor in conjunction with a pulse transmitter, to a pulse counter and the end values are digitally indicated or printed by same.

In an alternative way of carrying out the process the switching time of the electrolysis cell, may be transmitted, via a synchronous motor in combination with a remote transmitter, to a line recorder for graphical recording.

The individual components of the arrangement gathered together to form units may be accommodated in a structure, for example, in an oven having a constant temperature, in which disc-like magnet carriers, adapted to be rotated, are each arranged beneath the test vessel of a unit.

The invention will be described further, by way of example, with reference to the accompanying drawings in which.

Figure 1:
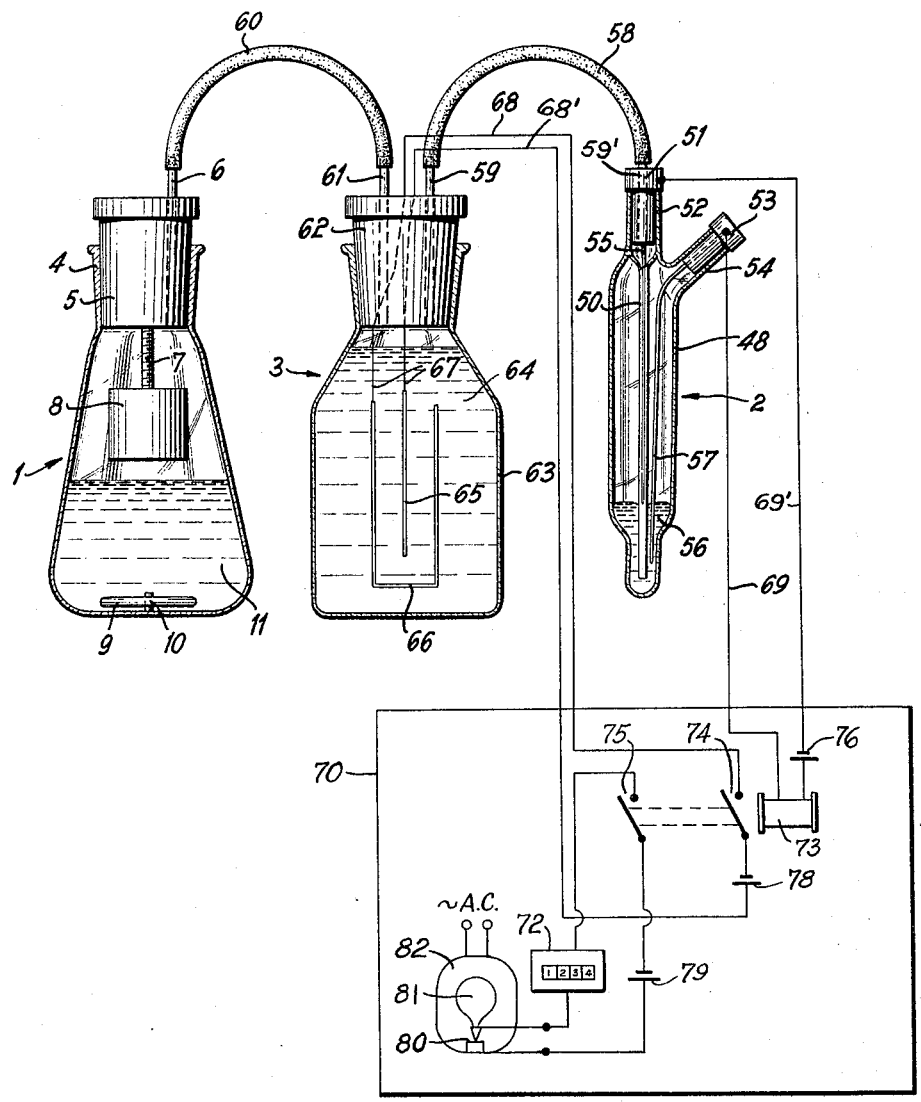
FIG. 1 is a schematic arrangement of a measuring system in accordance with one embodiment.

In FIG. 1, the arrangement substantially comprises a test vessel 1, a pressure gauge 2 and an electrolytic cell 3.

The neck 4 of the test vessel 1, for example, a wide-necked Erlenmeyer flask, is closed by a stopper 5. The stopper 5 is adapted to receive a connecting pipe member 6 leading to the test vessel and carries a beaker 8 on a threaded stud 7 adapted to accommodate a carbon dioxide absorber. The beaker 8 and the carbon dioxide absorber are known per se and do not form part of this invention. The contact pressure gauge 2 accommodates in an external tube 48 an internal pipe 50 of constant cross-section and open at its bottom end. It is provided with a connecting pipe 52 adapted to be closed by means of a stopper 53. An electrode 55 held by the stopper 51 is located in the inner pipe 50 so as to be just above the meniscus of mercury 56 when the apparatus is at rest. An electrode 57, gripped by the stopper 53, is passed into the outer tube 48 far enough to cause a constant contact with the mercury therein.

A flexible tube 58 leading through the stoppers 51 and 62 by means of connecting pipe members 59 and 59' respectively connects the interior of the internal pipe 50 with that of the electrolytic cell 3 and a further flexible tube 60 leading through the stoppers 5 and 62 by means of connecting pipe members 6 and 61 respectively connects the interior of the test vessel 1 also with that of the electrolytic cell 3, so that the interiors of the test vessel 1, of the electrolytic cell 3 and of the internal pipe 50 form a system of interconnected chambers closed to the atmosphere. The electrolytic cell, as shown, is a wide-necked steep-shouldered flask 63 containing copper sulphate solution 64. On the stopper 62 is a platinum electrode 65 and a copper electrode 66.

As shown diagrammatically in FIGURE 1, the electrodes 55 and 57 respectively of the contact pressure gauge 2 are connected by means of leads 69 and 69' to a switch gear 70 per se not forming part of this invention. This switch gear comprises a relay 73 with twin contacts 74 and 75 and a current source 76 which by means of the leads 69 and 69' forms a circuit with the electrodes of the contact pressure gauge 2.

The contacts 74 of the relay 73 are adapted to close a further circuit comprising a direct current source 78 which by means of the leads 68 and 68' is connected with the electrodes 65 and 66 respectively of the electrolytic cell 3, whereas the contacts 75 which are simultaneously closed with the contacts 74, are adapted to close a further circuit comprising a D.C.-source 79, an impulse contact 80 and a recording device 72 for counting the electric impulses of the impulse contact 80. In the embodiment shown the impulse contact is actuated by a cam 81 driven by a synchronous motor 82. The synchronous motor 82, impulse contact 80 and recording device 72 are known per se and do not form part of this invention.

Figure 2:
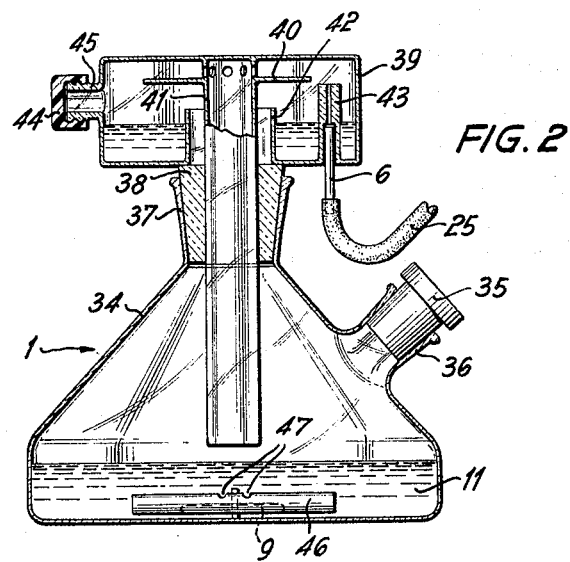
FIG. 2 is a schematic cross-section of an alternative form of test vessel to that illustrated in FIG. 1.

The test vessel 1 may be constructed as shown in FIG. 2. In this case, a so-called culture flask 34 with a side tube 36 having a stopper 35 which provides access for inserting or re-charging the test substance 11, accommodates a hollow stopper 38 in its neck portion 37. The hollow stopper 38 is the carrier of a container 39 for the carbon dioxide absorber. Integral with the container 39 is a pipe 41 projecting into the test vessel 34 and connected at the top to a flange edge 40. Also part of the container 39 is a collar 42, which delimits the carbon dioxide absorber, and a connecting pipe 43 projecting inwards, into which may be inserted a connecting pipe 6, for the tube 60 which leads to the contact pressure gauge 2. Moreover a charging pipe 45, provided with a screwed closure 44, forms an integral whole with the container 39.

In the alternative form of test vessel illustrated in FIG. 2, a magnetic stirring rod 9 is retained lying eccentrically in a pipe member 46, which, near the centre of the upper surface has air inducing bores 47.

The method in accordance with the invention is carried out as follows by using the aforedescribed arrangement as illustrated in FIGS. 1 and 2:

Owing to biological reactions, the test substance 11 when thoroughly mixed by means of the magnetic stirrer 9, absorbs oxygen and gives off certain quantities of carbon dioxide which are retained by the carbon dioxide absorber.

The construction of the test vessel 34 together with the carbon dioxide absorber container 39, as illustrated in FIG. 2, makes possible an increased oxygen charge into the test substance 11, together with adequate carbon dioxide absorption. The reason for this is a more thorough mixing of the test substance, the large area of the absorber and the intensive gas circulation provided.

The execution of the method, in conjunction with the automatically operating arrangement measuring the drop in pressure, corresponds to that using the manually actuated oxygen supply. In the former, the test substance 11, thoroughly mixed by the magnetic stirrer 9, absorbs oxygen and gives off certain quantities of carbon dioxide, which are absorbed by the carbon dioxide absorber. The drop in pressure resulting from this connects a circuit in the contact pressure gauge 48 by raising the mercury column in the inner tube 50, by means of which the circuit for releasing the relay 73 is closed. Thus, the twin contacts 74 and 75 are switched on thereby closing the circuits for the electrolytic cell 3 for the generation of oxygen and for counting the number of impulses produced by the synchronous motor 82 together with the impulse contact 80 during this time. Due to the generation of oxygen the pressure within the system rises again to its normal level, the result of which is a fall of the mercury within the internal pipe 50 and an interruption of the circuit bridged by the mercury. Thus the relay 73 and therewith the contacts 74 and 75 together with the corresponding circuits are switched off. Instantaneously the generation of oxygen and the counting of impulses by the recording device ceases.

We claim:

1. In a method of measuring oxygen absorption, including the biochemical oxygen absorption of water, when ascertaining the biochemical oxygen demand in a water supply, by supplying and measuring the quantity of oxygen necessary to compensate for the drop in pressure created by consumption in a system closed to the atmosphere and in which said system contains a sample to be tested, the improvement in which oxygen is supplied by electrolysis
    (a) discontinuously at a constant quantity per time unit during a period responsive to the consumption of oxygen by the sample; and
    (b) oxygen is supplied automatically after a first predetermined pressure has been reached and the supply is automatically discontinued after a second higher predetermined pressure has been reached.

2. A method according to claim 1, wherein an automatic supply of oxygen to the sample contained in a test vessel is brought about by permitting a drop in pressure to effect a contact pressure gauge which initiates the oxygen production in an electrolysis cell from which the oxygen passes into the test vessel.

3. A method according to claim 2, wherein the switching on time of the electrolysis cell is transmitted via a synchronous motor with pulse transmitter to a pulse counter and the end value is digitally recorded by same.

4. A method according to claim 2, wherein the switching-on time of the electrolysis cell is transmitted via a synchronous motor in combination with a remote transmitter to a line recorder for graphical recording.

5. A method according to claim 1, wherein the oxygen to be supplied is stored in a storage container in a chemically bound form, and is released by means of an electrolysis current of constant current intensity adapted to be switched on by a contact pressure gauge.

6. A method according to claim 5 in which oxygen is stored in a solution of copper sulphate.

7. In a method of determining the oxygen demand of a test sample in an atmospherically closed system, in which system means are provided to sense gas pressure change at said test sample, and in which system means are provided to supply oxygen to said system by electrolysis of an aqueous solution, the improvement in which electrolysis at a constant current is started and stopped in response to gas pressure change at said test sample.

(References on following page)

References Cited by the Examiner

UNITED STATES PATENTS

| | | | |
|---|---|---|---|
| 2,773,497 | 12/1956 | Anzi et al. | 128—2.07 |
| 2,809,928 | 10/1957 | Dudley et al. | 204—1 |
| 2,864,747 | 12/1958 | Roth | 204—1 |
| 2,876,189 | 3/1959 | Spracklen et al. | 204—195 |
| 2,929,687 | 3/1960 | Buchoff | 23—253 |
| 2,943,036 | 6/1960 | Thayer et al. | 204—195 |
| 2,974,018 | 3/1961 | McNeilly | 23—253 |
| 2,982,699 | 5/1961 | Johnson et al. | 195—103.5 |
| 2,996,436 | 8/1961 | Broida et al. | 195—103.5 |
| 3,045,665 | 7/1962 | Moyat | 204—129 |
| 3,162,585 | 12/1964 | De Ford et al. | 204—195 |

JOHN H. MACK, *Primary Examiner.*

JOHN R. SPECK, WINSTON A. DOUGLAS,
*Examiners.*

T. TUNG, *Assistant Examiner.*